(12) United States Patent
Cho et al.

(10) Patent No.: US 7,706,677 B2
(45) Date of Patent: Apr. 27, 2010

(54) MOBILE COMMUNICATION TERMINAL DEVICE

(75) Inventors: Woo-jong Cho, Suwon-si (KR); Won-jin Sunu, Suwon-si (KR); Sang-on Choi, Suwon-si (KR); Woo-jong Lee, Suwon-si (KR)

(73) Assignee: Samsung Electro-Mechanics Co., Ltd, Suwon-si (KR)

( * ) Notice: Subject to any disclaimer, the term of this patent is extended or adjusted under 35 U.S.C. 154(b) by 684 days.

(21) Appl. No.: 11/324,292

(22) Filed: Jan. 4, 2006

(65) Prior Publication Data

US 2006/0159443 A1  Jul. 20, 2006

(30) Foreign Application Priority Data

Jan. 14, 2005  (KR)  .............. 10-2005-0003556

(51) Int. Cl.
*G03B 17/18* (2006.01)
(52) U.S. Cl. .............. 396/287; 455/556.1; 455/575.3; 348/14.02; 348/52; 398/324; 398/374; 398/382; 398/429
(58) Field of Classification Search .......... 396/287, 396/148, 288, 296, 324, 374, 382, 429; 359/13, 359/15, 466, 480, 404, 407; 455/344, 556.1, 455/575.3; 348/14.02, 52
See application file for complete search history.

(56) References Cited

U.S. PATENT DOCUMENTS

| | | | | | |
|---|---|---|---|---|---|
| 5,774,175 | A | * | 6/1998 | Hattori | ............ 348/55 |
| 5,892,598 | A | * | 4/1999 | Asakawa et al. | ........... 359/13 |
| 6,069,648 | A | * | 5/2000 | Suso et al. | ........... 348/14.02 |
| 6,396,924 | B1 | * | 5/2002 | Suso et al. | ........... 379/433.13 |
| 6,445,366 | B1 | * | 9/2002 | Hattori | ............ 345/55 |
| 6,573,961 | B2 | * | 6/2003 | Jiang et al. | ........... 349/115 |
| 6,633,731 | B2 | * | 10/2003 | Nanjo et al. | ........... 396/296 |
| 6,753,923 | B2 | * | 6/2004 | Gyoten | ............ 348/383 |
| 7,144,113 | B2 | * | 12/2006 | Fujikawa et al. | ........... 353/7 |
| 7,145,593 | B2 | * | 12/2006 | Yamaguchi et al. | ........ 348/14.02 |
| 7,317,498 | B2 | * | 1/2008 | Hara et al. | ........... 349/62 |
| 7,339,649 | B2 | * | 3/2008 | Imai et al. | ........... 349/200 |
| 7,424,214 | B2 | * | 9/2008 | Kim et al. | ........... 396/72 |
| 7,430,025 | B2 | * | 9/2008 | Okamoto et al. | ........... 349/56 |
| 2001/0005454 | A1 | * | 6/2001 | Nishino et al. | ........... 396/287 |
| 2004/0233275 | A1 | * | 11/2004 | Tomita | ........... 348/51 |

(Continued)

FOREIGN PATENT DOCUMENTS

JP   2002152348 A  *  5/2002

*Primary Examiner*—W. B. Perkey
*Assistant Examiner*—Linda B Smith
(74) *Attorney, Agent, or Firm*—Sughrue Mion, PLLC

(57) ABSTRACT

A mobile communication terminal device, capable of implementing large screen and displaying stereoscopic images, includes: a first case and a second case; a first and a second display part mounted on the first case and the second case, respectively; lens modules mounted in front of the first and second display parts for producing virtual images for images of the first and second display parts; and a rotation member for rotating the first case and the second case on the same rotation axis. The mobile communication terminal device further includes: a first case and a second case; a rotation member for rotating the first case and the second case on the same rotation axis; and a viewfinder unit mounted on one side of at least one of the first case and the second case.

9 Claims, 2 Drawing Sheets

U.S. PATENT DOCUMENTS

| | | |
|---|---|---|
| 2005/0062913 A1* | 3/2005 | Choi et al. .................. 349/114 |
| 2005/0111100 A1* | 5/2005 | Mather et al. ................ 359/464 |
| 2006/0114374 A1* | 6/2006 | Segawa et al. ................ 349/95 |
| 2006/0146013 A1* | 7/2006 | Arneson et al. ............. 345/156 |
| 2006/0170806 A1* | 8/2006 | Saiki et al. ............. 348/333.01 |

* cited by examiner

MOBILE COMMUNICATION TERMINAL DEVICE

This application claims priority under 35 U.S.C. §119 from Korean Patent Application No. 2005-03556, filed Jan. 14, 2005, in the Korean Intellectual Property Office, the entire content of which is incorporated herein by reference.

BACKGROUND OF THE INVENTION

1. Field of the Invention

The present invention relates to a mobile communication terminal device, and more particularly, to a mobile communication terminal device which is capable of implementing large screen and displaying stereoscopic images.

2. Description of the Prior Art

Usually, a mobile communication terminal device includes a body equipped with a program inside, and Liquid Crystal Display (LCD) modules electrically connected to the body for displaying information.

A mobile communication terminal device is generally divided into a flip type in which an LCD is integrally coupled thereto to be exposed to the outside, and a folder type in which an LCD is coupled to be relatively rotated against the body.

As an example of the folder type mobile communication terminal device, U.S. Pat. No. 6,396,924 (date of patent: May 28, 2002, titled "Information Communication Terminal Device") has been disclosed.

The device disclosed in the above patent includes a first display/operation part and a second display/operation part mounted on an upper and a lower case, respectively. Also, it has a housing member accommodating a video camera therein, and a support mechanism supporting rotatively the first display/operation part and the second display/operation part on the same rotation axis. The first and second display/operation parts, mounted rotatively at least 180 degrees about the housing member, are structured so as to be opposed to one another when the mobile communication terminal device is in an opened condition and overlapped with one another when the mobile communication terminal device is in a closed condition. With the above construction, the mobile communication terminal device can have excellent portability, deal a moving image, and realize multifunction.

Recently, a mobile communication terminal device demands high performance due to the advancement of multimedia functions, and also demands large screen display and a stereoscopic image display unit for satellite Digital Media Broadcasting (DMB) or digital broadcasting. However, the miniaturization tendency in a mobile communication terminal device makes it difficult to mount a large screen display. Although a screen size has been enlarged or a projection system has been employed in order to solve the above problems, it is difficult to make a practical product with the existing technology.

SUMMARY OF THE INVENTION

It is an aspect of the present invention to provide a mobile communication terminal which is capable of implementing large screen and displaying stereoscopic images.

According to a first embodiment of the present invention disclosed in order to achieve the above aspect, there is provided a mobile communication terminal device comprising: a first case and a second case; a first and a second display part mounted on the first case and the second case, respectively; lens modules mounted in front of the first and second display parts for producing virtual images for images of the first and second display parts; and a rotation member for rotating the first case and the second case on one rotation axis.

The lens module could be made of a lens capable of planarization, such as at least one of a spherical lens, an aspherical lens, a fresnel lens, a high refractive lens, a hologram lens, and a grid lens.

The first and second display parts independently display mutually different images on which a difference of angular fields is reflected or display the mutually different images by using color difference, polarization or holographic diffraction and interference.

According to a second embodiment of the present invention, there is provided a mobile communication terminal device comprising: a first case and a second case; a rotation member for rotating the first case and the second case on one rotation axis; and a viewfinder unit mounted on one side of at least one of the first case and the second case.

The viewfinder unit comprises: windows arranged on one side of at least one of the first case and the second case; LCD modules arranged on at least one side of the first case and the second case across the medial axis of the windows; lens barrels for connecting the LCD modules and the windows; and lens modules mounted in front of the LCD modules for enlarging images of the LCD modules.

The lens modules, such as at least one of a spherical lens, an aspherical lens, a fresnel lens, a high refractive lens, a hologram lens, and a grid lens, are moved or replaced according to the sight of a user.

The viewfinder unit is mounted on both sides of the first and second cases, and the LCD modules, arranged on internal sides of the first and second cases, independently display mutually different images on which a difference of angular fields is reflected or display the mutually different images by using color difference, polarization or holographic diffraction and interference.

With the above construction, the embodiments of the mobile communication terminal device according to the present invention have a large screen, and display of stereoscopic images is implemented while installation space is reduced.

In addition, one can view an image with high resolution photographed by a camera (not shown) instantly through the large screen.

Also, the device can be used as a personal display device with a similar use to an HMD (Head Mounting Display), thereby allowing use without interruption of surroundings in public places.

Furthermore, the viewfinder unit can make it possible to view images even in a bright place.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF EXEMPLARY EMBODIMENTS

Exemplary embodiments of the present invention will now be described with reference to the accompanying drawings.

First Embodiment

Figure 1:
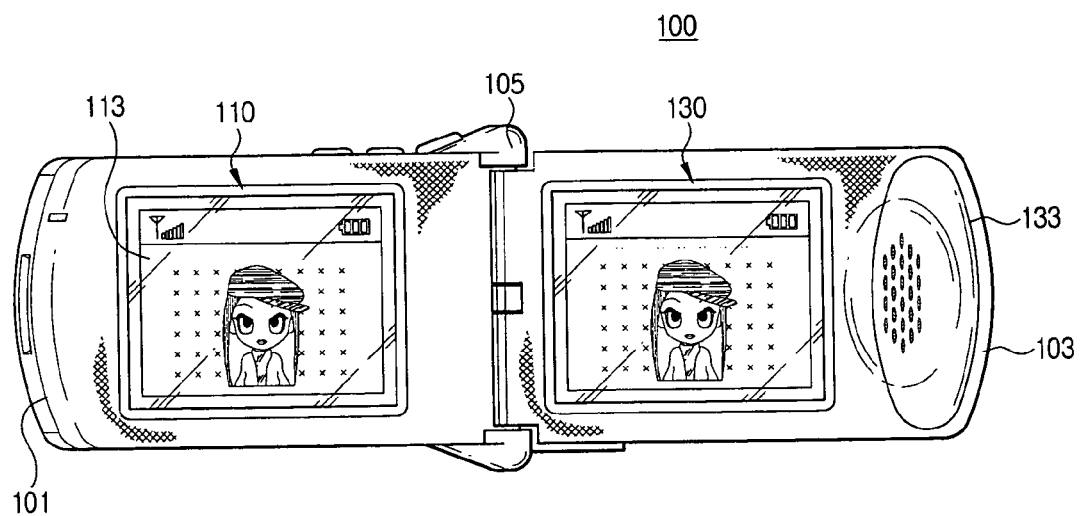
FIG. 1 is a plan view showing the construction of a mobile communication terminal device in accordance with one embodiment of the present invention.
Figure 2:
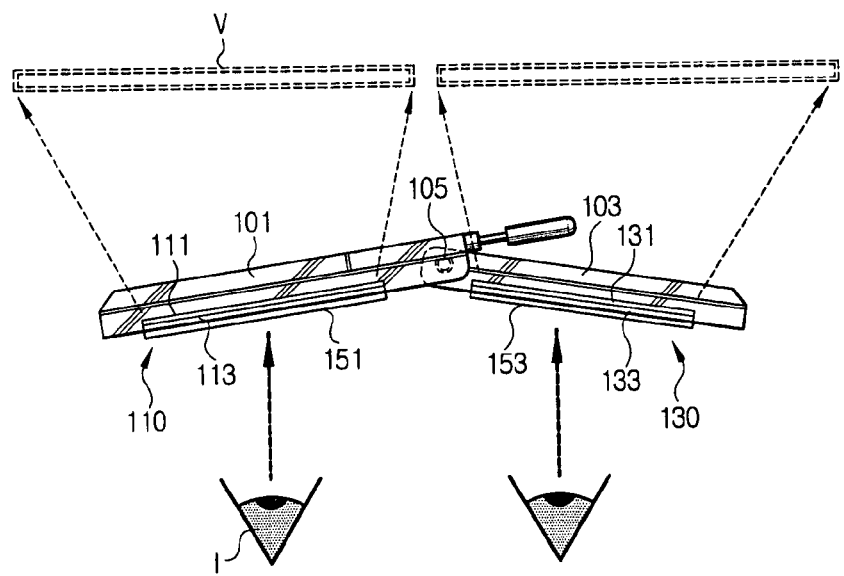
FIG. 2 is a side view showing the construction of a mobile communication terminal device in accordance with one embodiment of the present invention.

FIG. 1 is a plan view showing the construction of a mobile communication terminal device in accordance with one embodiment of the present invention, and FIG. 2 is a side view showing the construction of a mobile communication terminal device in accordance with one embodiment of the present invention.

Referring to FIG. 1 and FIG. 2, the mobile communication terminal 100 according to the present invention includes a first and a second case 101 and 103, a rotation member 105, a first and a second display part 110 and 130, and a first and a second lens module 151 and 153.

The first and second cases 101 and 103 have the first and second display parts 110 and 130 thereon respectively, and the rotation member 105 is mounted to rotate the first and second cases 101 and 103 on one rotation axis. In this case, the first and second display parts 110 and 130 overlap with each other when the first and second cases 101 and 103 are in a closed condition.

Referring to FIG. 2, the first and second display parts 110 and 130 for displaying images comprise backlight units 111 and 131, and LCD panels 113 and 133.

The lens modules 151 and 153 are mounted in front of the LCD panels 113 and 133 for producing virtual images from LCD images, in which virtual images have an effect that a user feels as if he/she views images through a large screen. Various lens modules capable of planarization can be used as the lens modules 151 and 153, such as a spherical lens, an aspherical lens, a fresnel lens, a hologram lens, and a grid lens.

In the construction described above, operation parts on which each kind of operation keys is arranged can be mounted on the outside of the first case 101 or the second case 103, or can be implemented in a touch type screen.

As shown in FIG. 2 with the above described construction, when user eyes I approach the lens modules 151 and 153, the user views an image formed on the LCD panels 113 and 133 as an virtual image which is enlarged through the lens modules 151 and 153, thereby implementing a large screen view.

Meanwhile, with the above described construction, the first and second display parts 110 and 130 can display images stereoscopically. The stereoscopic image display can be implemented by independently displaying mutually different images on which a difference of angular fields is reflected on the first and second display parts 110 and 130, or displaying the mutually different images by using color difference of both images, polarization or holographic diffraction and interference.

Second Embodiment

Figure 3:
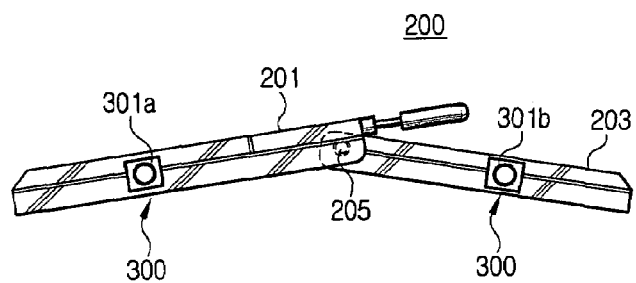
FIG. 3. is a side view showing the construction of a mobile communication terminal device in accordance with another embodiment of the present invention.
Figure 4:
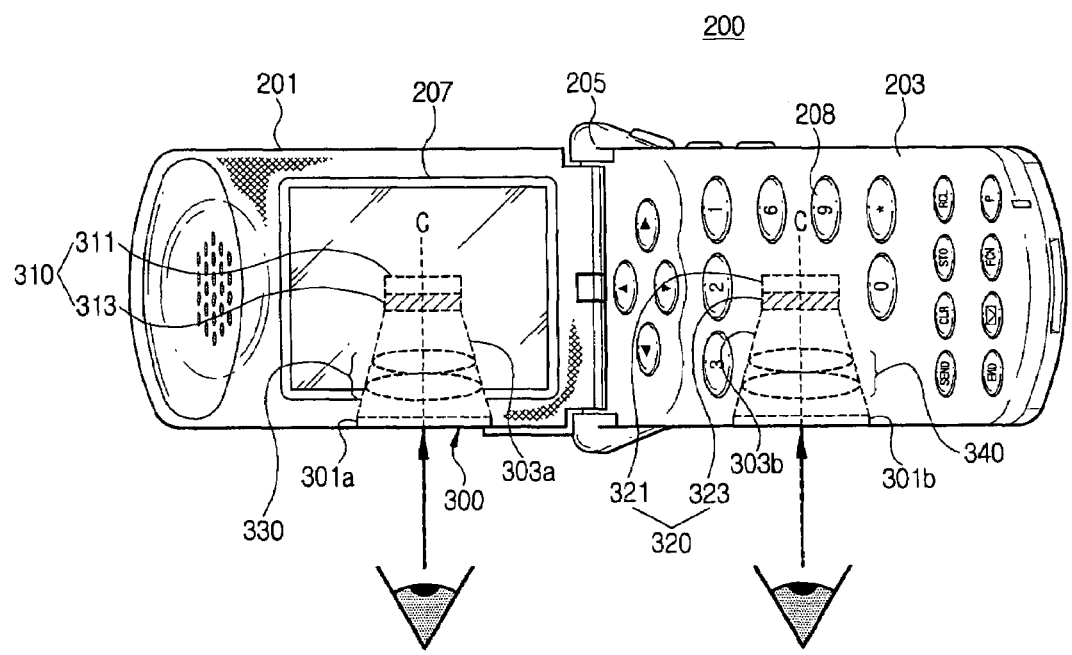
FIG. 4 is a plan view showing the construction of a mobile communication terminal device in accordance with another embodiment of the present invention.

FIG. 3 is a side view showing the construction of a mobile communication terminal device in accordance with another embodiment of the present invention, and FIG. 4 is a plan view showing the construction of a mobile communication terminal device in accordance with another embodiment of the present invention.

Referring to FIGS. 3 and 4, the mobile communication terminal device 200 in accordance with another embodiment of the present invention includes a first and a second case 201 and 203, a rotation member 205, and a viewfinder unit 300.

The first and second cases 201 and 203 are rotated by the rotation member 205. The first case 201 provides an image display part 207 thereon for displaying images, and the second case 203 provides an operation part 208 thereon.

The viewfinder unit 300 is mounted on one side of at least one of the first case 201 and the second case 203. In FIG. 3, it is mounted on both sides of the first case 201 and the second case 203.

The viewfinder unit 300 comprises windows 301a and 301b arranged on both sides of the first case 201 and the second case 203, LCD modules 310 and 320 arranged on the first case 201 and the second case 203 across the central axis C of the windows 301a and 301b, lens barrels 303a and 303b for connecting the LCD modules 310 and 320 and the windows 301a and 301b; and lens modules 330 and 340 mounted in front of the LCD modules 310 and 320 for enlarging images of the LCD modules 310 and 320.

The LCD modules 310 and 320, like in the First Embodiment, comprise backlight units 311 and 321, LCD panels 313 and 323 and so forth, for displaying images.

The lens modules 330 and 340 are moved or replaced so as to be corrected according to the sight of a user, and are made of a lens, such as at lease one of a spherical lens, an aspherical lens, a fresnel lens, a high refractive lens, a hologram lens, and a grid lens.

With the above mentioned construction, when user eyes I approach the windows 301a and 301b, the user can view an image enlarged through the lens modules 330 and 340, thereby implementing large screen view.

In the meantime, the above mentioned mobile communication terminal device 200 can display stereoscopic images. The stereoscopic image display can be implemented, like in the First Embodiment, by independently displaying mutually different images on which a difference of angular fields is reflected on the LCD modules 310 and 320 respectively provided in the left and the right, or displaying the mutually different images by using color difference of both images, polarization or holographic diffraction and interference.

In the above mentioned construction, although the viewfinder unit 300 has been illustrated by being arranged on both sides of the first and second cases 201 and 203, the construction is not limited to that. The viewfinder unit 300 can be mounted on one of the first and second cases 201 and 203 to enable a user to view images with only one eye. In this case, only large screen function can be implemented.

While the invention has been shown and described with reference to certain embodiments thereof, it will be understood by those skilled in the art that various changes in form and details may be made therein without departing from the spirit and scope of the invention as defined by the appended claims.

What is claimed is:

1. A mobile communication terminal device comprising:
   a first case and a second case;
   at least one image display part provided on at least one of the first case and the second case;
   a viewfinder unit mounted on both sides of the first case and the second case; and
   a rotation member for rotating the first case and the second case on one rotation axis.

2. The mobile communication terminal device according to claim 1, wherein the viewfinder unit comprises:
   windows arranged on both sides of the first case and the second case;
   LCD modules arranged on both sides of the first case and the second case across the central axis of the windows;
   lens barrels for connecting the LCD modules and the windows; and
   lens modules mounted in front of the LCD modules for enlarging images of the LCD modules.

3. The mobile communication terminal device according to claim 2, wherein the lens modules are made of at least one of a spherical lens, an aspherical lens, a fresnel lens, a high refractive lens, a hologram lens, and a grid lens.

4. The mobile communication terminal device according to claim 2, wherein the LCD modules independently display mutually different images on which a difference of angular fields is reflected or display the mutually different images by using color difference, polarization or holographic diffraction and interference.

5. A mobile communication terminal device comprising:
   a first case and a second case;
   a rotation member for rotating the first case and the second case on one rotation axis; and
   a viewfinder unit mounted on both sides of the first case and the second case,
   wherein the sides of the first case and the second case are disposed to be perpendicular to surfaces of the first case and the second case that face each other or move away from each other when the first case and the second case are rotated on the one rotation axis.

6. The mobile communication terminal device according to claim 5, wherein the viewfinder unit comprises:
   windows arranged on both sides of the first case and the second case;
   LCD modules arranged on both sides of the first case and the second case across the central axis of the windows;
   lens barrels for connecting the LCD modules and the windows; and
   lens modules mounted in front of the LCD modules for enlarging images of the LCD modules.

7. The mobile communication terminal device according to claim 6, wherein the lens modules are movable or replaceable based on the sight of a user.

8. The mobile communication terminal device according to claim 6, wherein the lens modules are made of at least one of a spherical lens, an aspherical lens, a fresnel lens, a high refractive lens, a hologram lens, and a grid lens.

9. The mobile communication terminal device according to claim 6, wherein the LCD modules arranged on internal sides of the first and second cases independently display mutually different images on which a difference of angular fields is reflected or display the mutually different images by using color difference, polarization or holographic diffraction and interference.

* * * * *